United States Patent [19]

Legille et al.

[11] Patent Number: 4,605,342
[45] Date of Patent: Aug. 12, 1986

[54] DEVICE FOR INTRODUCING DOSED QUANTITIES OF PULVERIZED SOLID MATERIALS INTO A CARRIER GAS STREAM

[75] Inventors: Edouard Legille, Luxembourg; Léon Ulveling; Pierre Mailliet, both of Howald, all of Luxembourg

[73] Assignee: Paul Wurth S.A., Luxembourg, Luxembourg

[21] Appl. No.: 721,565

[22] Filed: Apr. 10, 1985

[30] Foreign Application Priority Data

Apr. 11, 1984 [LU] Luxembourg .......................... 85298

[51] Int. Cl.⁴ .............................................. B65G 53/46
[52] U.S. Cl. .................................... 406/129; 222/476; 222/548; 406/131
[58] Field of Search ................. 406/50, 128, 129, 131; 222/476, 548, 553

[56] References Cited

U.S. PATENT DOCUMENTS

| 1,271,107 | 7/1918 | Weller | 406/129 X |
| 3,179,471 | 4/1965 | Savage . | |

FOREIGN PATENT DOCUMENTS 20698 of 1910 United Kingdom .
371147 5/1973 U.S.S.R. .
426933 2/1975 U.S.S.R. .

Primary Examiner—Jeffrey V. Nase
Attorney, Agent, or Firm—Fishman & Dionne

[57] ABSTRACT

A device for introducing dosed quantities of pulverized solid materials into a carrier gas stream is presented. The device is particularly suitable for injecting solid fuels into a shaft furnace during metal refining. The device comprises a housing having oppositely disposed inlet and outlet radial apertures therethrough. The inlet radial aperture is connected to a container holding pulverized materials. Coaxial inner and outer sleeves, at least one of which is capable of rotation, are located within the housing. Upon rotation of a sleeve, pairs of oppositely disposed slots provided on each sleeve will align and overlap with each other and with the pair of oppositely disposed apertures to define variable sized passages. A cheek positioned on one end of the housing has a cylindrical extension portion which extends axially into the inner sleeve and extends across the inlet and outlet apertures. The extension portion includes a channel therethrough which is axially aligned with the first and second aperture means and is also connected to a source of pressurized fluid.

16 Claims, 3 Drawing Figures

DEVICE FOR INTRODUCING DOSED QUANTITIES OF PULVERIZED SOLID MATERIALS INTO A CARRIER GAS STREAM

BACKGROUND OF THE INVENTION

The present invention relates to an apparatus for introducing measured or dosed quantities of pulverized or pulverulent materials into a carrier gas stream.

An apparatus for proportioning and extracting pulverized materials of the type herein discussed, has been disclosed in European Patent Application No. 0108319 as well as in Luxembourg Patent Application No. 84-462 corresponding to U.S. patent application Ser. No. 550,565, and Luxembourg Patent Application No. 84-780 corresponding to U.S. patent application Ser. No. 604,465, the two U.S. patent applications being assigned to the assignee hereof, all the contents of which are incorporated herein by reference. The invention described in European Patent Application No. 0108319 and the pending U.S. applications are particularly applicable to the operation of injecting solid fuels into a shaft furnace during a metal refining process.

In the dosing apparatus described in the above-mentioned patent applications, the propulsion fluid or carrier gas (usually consisting of air under pressure) passes through and leaves the dosing device in the axial direction, carrying along with it the pulverulent materials introduced through a lateral orifice. The current of pulverulent materials must therefore be deflected more or less at right angles when the pneumatic (entrained carrier gas) current is formed. This right angle deflection can be easily achieved in the case of certain small solid substances, such as coal dust (of which the grain size does not exceed 0.1 mm). However, as the granulometry of the particles increases, it becomes more difficult to achieve adequate deflection of the pulverulent materials. The problem is particularly acute in the case of calcium silicates (CaSi) injected into baths of steel during refining. In addition to the risk of premature wear to the dosing device, this deflection involves the alternate braking and acceleration of the pulverulent particles, resulting in a loss of speed and in a reduction of the quantity of material which can pass through the dosing device.

SUMMARY OF THE INVENTION

The above discussed and other problems of the prior art are overcome or alleviated by the dosing apparatus of the present invention. In accordance with the present invention, an improved dosing device of the type disclosed in European Patent Application No. 0108319 and U.S. patent application Ser. Nos. 550,565 and 604,465 is provided wherein the deflection (particularly at right angles) of the solid materials is avoided.

The present invention comprises a preferably cylindrical housing partially traversed in the axial direction. The housing has a first inlet radial aperture which communicates with a reservoir containing pulverized solid material. The pressure in the reservoir of solid material should be about that of the carrier gas. The housing further contains two coaxial sleeves defined as an inner sleeve and an outer sleeve. At least one of the two sleeves is capable of rotating about its longitudinal axis and is connected for this purpose to a suitable driving device for imparting rotation. Each of the sleeves is further provided with first inlet slots positioned so as to correspond with each other and with the inlet radial aperture on the housing. Thus, the first slots are permitted to meet and overlap each other as the rotatable sleeve rotates about its axis. The overlapping and identical slots on the inner and outer sleeve thus defines a passage of varying size (depending on the position of the rotating sleeve).

An important feature of the present invention is that the housing further comprises a second outlet radial aperture diametrically opposite the first inlet side aperture. Also, each of the sleeves are provided with second outlet slots positioned so as to correspond with each other and with the second outlet side or radial aperture on the housing. One end of the housing (i.e., the end opposite the driving device of the movable sleeve) is closed by a cheek which includes a cylindrical portion extending axially into the inner sleeve and having a channel axially aligned with the two first and second radial apertures of the housing and being connected to the source of pressurized fluid.

The channel is preferably connected to the pressurized fluid source by two passages or conduits terminating at diametrically opposite points into the channel and axially connected through the aforementioned cylindrical portion to the source of pressurized fluid.

The two conduits preferably terminate obliquely into the channel in such a way as to converge in the direction of the second orifice of the housing.

Preferably, the shape of the channel cross-section changes variably in accordance with the shapes of the inlet and outlet slots of the concentric sleeves.

In accordance with the apparatus of the present invention, the pulverulent material to be conveyed by the pressurized fluid, i.e., air, passes through the dosing device without being deflected. Instead, the pressurized fluid undergoes the deflection (substantially at right angles) which the solid material underwent in prior art dosing devices.

The above discussed and other advantages of the present invention will be apparent to and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Figure 1:
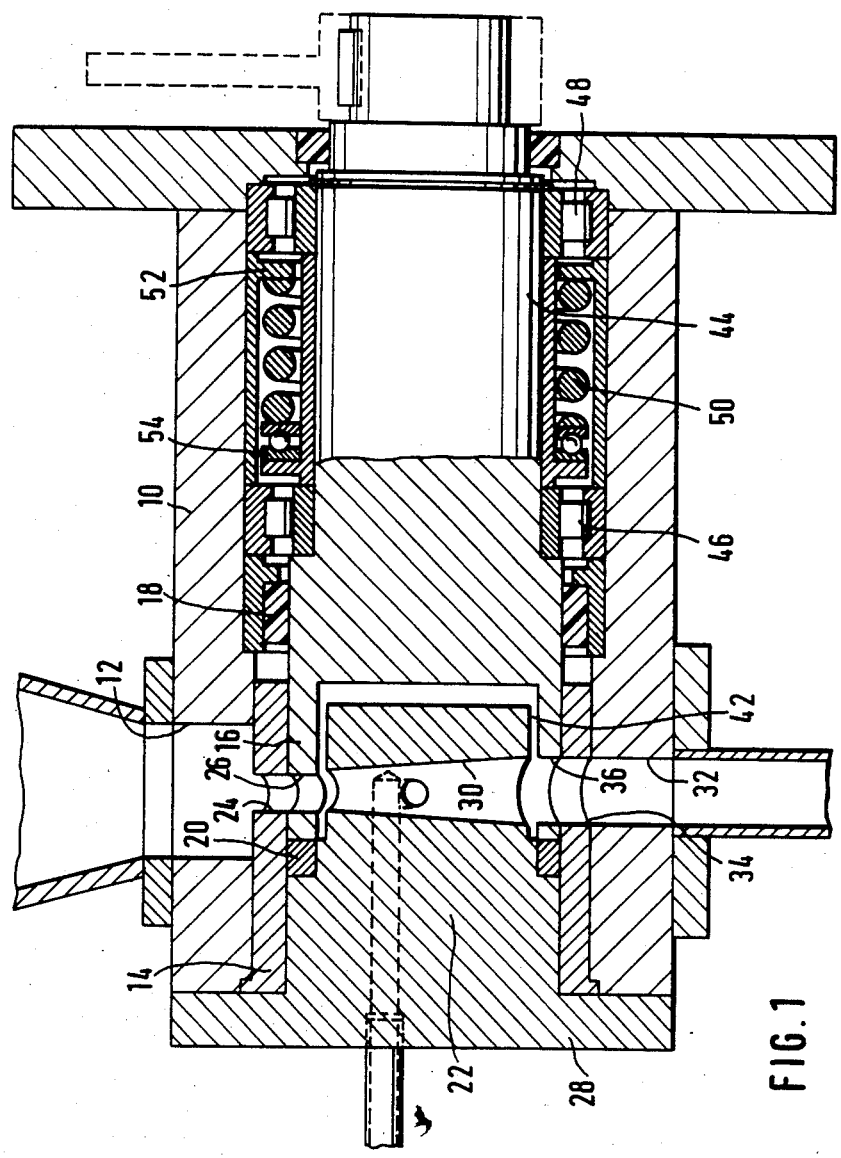
FIG. 1 is a cross-sectional elevation view of a dosing apparatus in accordance with the present invention.
Figure 2:
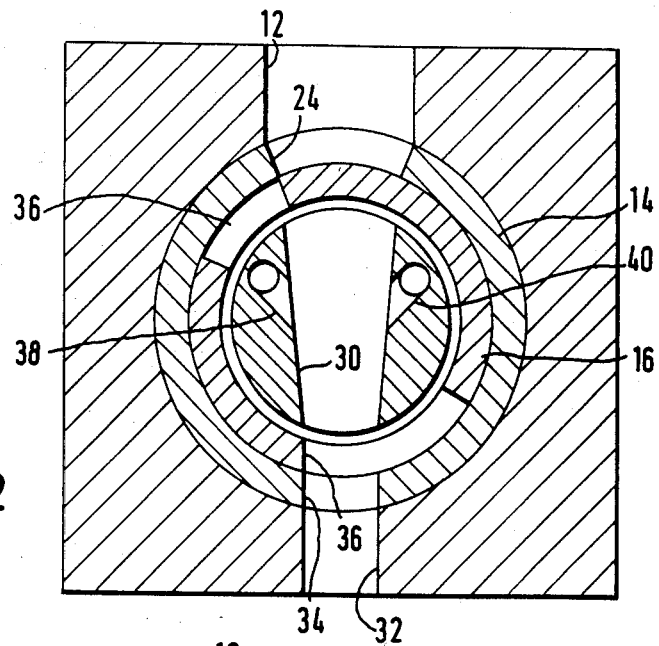
FIG. 2 is a cross-sectional elevation view through the slots of the dosing device of FIG. 1 in a closed position.
Figure 3:
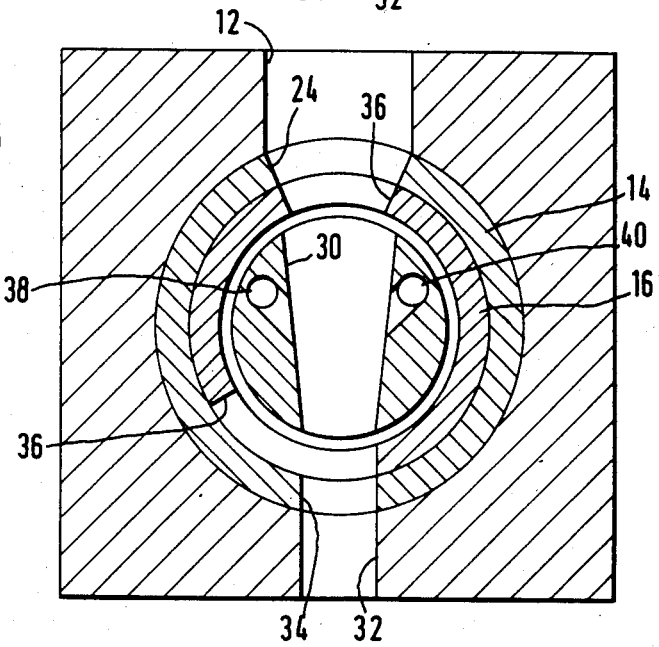
FIG. 3 is a cross-sectional elevation view through the slots of the dosing device of FIG. 1 in an open position.

The dosing device for measuring or proportioning pulverized or pulverulent materials and introducing measured quantities thereof into a carrier gas stream is generally shown in FIG. 1 and is related to the dosing devices disclosed in the aforementioned European and U.S. patent applications. The dosing device of FIG. 1 comprises a preferably cylindrical housing 10 having a first inlet radial or side aperture 12 which is connected to a pressurized container of solid material, such as pulverulent material. Housing 10 contains therein, two coaxial cylindrical sleeves 14 and 16 defined as an outer sleeve 14 and inner sleeve 16. In the illustrated embodiment, the outer sleeve 14 is fixed in position while the inner sleeve 16 can freely rotate (via a driving device) about the longitudinal axis of the housing. The required tension between rotatable sleeve 16 and housing 10 is ensured by a joint 18. The leading portion of rotatable sleeve 16 contacts or rubs against a friction ring 20, as is described in European patent application 0108319. The two sleeves 14 and 16 are each provided with first inlet radial dosing slots 24 and 26, respectively. Slots 24 and 26 define a passage for the entry of pulverized material, the passage having a size that will vary according to the angular position occupied by the movable or rotatable sleeve 16. This variable passage permits the flow of pulverized material to vary between a maximum when the slots are completely superimposed to a minimum when the slots no longer coincide and the pulverized material is prevented from flowing therethrough. Further details of the features and structure of the present invention which are also found in the prior art dosing devices are more fully described in the aforementioned patent applications.

In contrast to the prior art dosing devices described in the previously discussed patent applications, in accordance with the present invention, the pulverulent material is not deflected as it flows into the carrier gas stream of the dosing device, but instead passes therethrough in a straight line. This important feature of the present invention is provided by the front cheek 28 of housing 10 which comprises a cylindrical portion 22. Cylindrical portion 22 penetrates inner sleeve 16 to a point beyond inlet slots 24 and 26 and is provided with a diametral channel 30 which is disposed across from slots 24 and 26.

Housing 10 also includes an outlet radial or side aperture 32 positioned at a point diametrically opposite inlet aperture 12. Sleeves 14 and 16 similarly have overlapping outlet slots 34 and 36 at points diametrically opposite the inlet slots 24 and 26 such that when the movable sleeve 16 is set at a predetermined angle, the inlet aperture 12 and the outlet aperture 32 will be in direct communication, this communication being variable between an open and closed position via the rotation of movable sleeve 16.

Referring now to FIG. 2, when movable sleeve 16 is in the position shown therein, slot 24 of the fixed sleeve 14 is completely masked, so that the passage or channel 30 is closed. It should be noted that the outlet slot 36 of the rotary sleeve 16 is preferably longer than the inlet slot, in order to provide passage for the pressurized fluid in the closed position shown in FIG. 2.

Clockwise rotation of movable sleeve 16 from the position shown in FIG. 2 progressively opens passage 30 to the pulverulent material until the maximum cross section, shown in FIG. 3 is reached.

The pressurized fluid (air) enters channel 30 via two pipes or conduits 38 and 40 penetrating cheek 28 and cylindrical portion 22 thereof in the axial direction until the channel 30 is reached; thereafter preferably emerging symmetrically and obliquely into the latter.

Preferably, an annular space 42 is provided between inner sleeve 16 and cylindrical portion 22 as hermeticity is not required in this position; in addition to which this space is made relatively wide in order to ensure that no seizing can occur.

It will be appreciated that outlet aperture 34 has a circular cross section in accordance with the cross-section of the pneumatic transport pipe (not shown) downstream from the dosing device. Consequently, as slots 24 and 26 have an elongated shape, the form taken by the cross section of the channel 30 progressively changes, in order to correspond to the elongated slots 24,26 at one end and the circular aperture 34 at the other end. As a result of the increase in the speed of the mixture of pulverulent material and transport gas, the cross section of channel 30 may be far smaller at the outlet than at the inlet (see FIGS. 2 and 3).

Movable inner sleeve 16 forms a portion of a solid shaft 44 mounted coaxially in housing 10 by means of a pair of bearings 46 and 48 in such a way as to enable it to rotate about its longitudinal axis. Between bearings 46 and 48 is a compression spring 50 resting at one end on an internal circular shoulder 52 of housing 10 and at the other end on an external circular shoulder 54 of shaft 44. Shoulders 52 and 54 may also be provided, as shown in the drawing, on separate supports connected into housing 10 and onto shaft 44, respectively. The action of spring 50 tends to thrust shaft 44 towards the left (as viewed in FIG. 1), i.e. to keep movable sleeve 16 supported on ring 20 and to balance out any wear suffered by the latter. For spring 50 to achieve this action, shaft 44 must be free in the axial direction. As a result, rollers or needles are preferably selected as the elements for bearings 46 and 48.

Exterior of housing 10, shaft 44 is actuated by a suitable driving mechanism causing it to rotate about its longitudinal axis in order to reduce or increase the width of the passage 30 disposed across from slots 24 and 26.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A device for introducing pulverized materials in a carrier gas stream comprising:

housing means;

inlet aperture means in said housing means for delivery of pulverized material;

outlet aperture means in said housing means, said outlet aperture means being positioned in opposing relation to said inlet aperture means;

inner sleeve means in said housing and extending across said inlet and outlet aperture means, said inner sleeve means having an axial bore;

outer sleeve means, said outer sleeve means being coaxial with said inner sleeve means and extending across said inlet and outlet aperture means, at least one of said outer and inner sleeve means being rotatable about its longitudinal axis;

means for rotating at least one of said outer and inner sleeve means;

at least a first pair of opposing slots on said inner sleeve means and at least a second pair of opposing slots on said outer sleeve means, said first and second pairs of opposing slots being capable of mutual overlapping alignment with each other and with said inlet and outlet aperture means to define a pair of variable sized opposing passages;

cheek means positioned on one end of said housing means, said cheek means including an extension portion which extends axially into said inner sleeve means axial bore and extending across said inlet and outlet aperture means, said cheek means extension portion including a channel therethrough, said channel being fixed in axial alignment with said inlet and outlet aperture means and being connectable to a pressurized fluid source.

2. The device of claim 1 wherein:

said rotating means is positioned at a first end of said housing means; and said cheek means is positioned at a second end of said housing means, said first end being oppositely disposed from said second end.

3. The device of claim 1 wherein:

said housing means is substantially cylindrical.

4. The device of claim 3 wherein:

said cheek means extention portion is substantially cylindrical; and wherein said channel through said extention portion is diametral.

5. The device of claim 1 wherein:

said cheek means extention portion is substantially cylindrical; and wherein said channel through said extention portion is diametral.

6. The device of claim 1 wherein:

said inner sleeve is rotatable about its longitudinal axis, and said outer sleeve is fixedly engaged within said housing means.

7. The device of claim 1 wherein said channel is connectable to said pressurized fluid source by a pair of conduits, said conduits being located within said cheek means and terminating in said channel.

8. The device of claim 7 wherein:

said conduits terminate in said channel at opposing locations.

9. The device of claim 7 wherein:

said conduits are connectable to said pressurized fluid source axially through said extention portion.

10. The device of claim 7 wherein:

said conduits terminate obliquely in said channel so as to converge in the direction of said outlet aperture means.

11. The device of claim 1 wherein:

the cross-sectional profile of said channel varies in accordance with the shapes of said first and second pairs of slots.

12. The device of claim 1 wherein said rotatable sleeve means forms a portion of a shaft, said shaft being coaxially mounted in said housing means; and including:

bearing means for coaxially mounting said shaft in said housing; and spring means disposed between one end of said housing and said shaft.

13. The device of claim 12 wherein:

said bearings are of the roller or needle type.

14. The device of claim 12 including:

an internal shoulder in said housing means, said spring means contacting said internal shoulder; and an external shoulder on said shaft, said spring means contacting said external shoulder.

15. The device of claim 1 including:

a space between said inner sleeve means and said extension portion.

16. The device of claim 1 wherein said channel has an outlet end and an inlet end, said outlet end having a smaller cross-section than said inlet end.

* * * * *